United States Patent [19]
Morse

[11] Patent Number: 5,111,210
[45] Date of Patent: May 5, 1992

[54] COLLISION AVOIDANCE RADAR DETECTOR SYSTEM

[75] Inventor: Robert L. Morse, Norfolk, Va.

[73] Assignee: Survival Safety Engineering, Inc., Virginia Beach, Va.

[21] Appl. No.: 542,072

[22] Filed: Jun. 22, 1990

[51] Int. Cl.⁵ ............................................. G01S 13/93
[52] U.S. Cl. .................................... 342/455; 342/27; 342/29; 342/41; 342/147; 342/417; 342/443
[58] Field of Search .................... 342/20, 56, 147, 158, 342/418, 419, 443, 455, 27, 29, 41, 417

[56] References Cited

U.S. PATENT DOCUMENTS

| | | | |
|---|---|---|---|
| 3,380,051 | 4/1968 | Cartwright | 343/10 |
| 3,422,437 | 1/1969 | Marston | 343/754 |
| 3,660,844 | 5/1972 | Potter | 342/20 |
| 3,671,964 | 6/1972 | Trochanowski et al. | 342/20 |
| 3,946,395 | 3/1976 | Kirchhoff | 343/113 |
| 4,074,268 | 2/1978 | Olson | 343/106 |
| 4,182,990 | 1/1980 | Coffin et al. | 342/20 X |
| 4,196,393 | 4/1980 | Schweitzer | 342/20 x |
| 4,700,191 | 10/1987 | Manor | 342/13 |
| 4,791,420 | 12/1988 | Baba | 342/20 |
| 4,851,854 | 7/1989 | Drogin | 342/417 |
| 4,860,013 | 8/1989 | Huntley | 342/20 |
| 4,949,088 | 8/1990 | Ryan et al. | 342/20 |
| 4,952,936 | 8/1990 | Martinson | 342/20 |
| 4,956,644 | 9/1990 | Leahy et al. | 342/351 |

Primary Examiner—John B. Sotomayor
Attorney, Agent, or Firm—Kerkam, Stowell, Kondracki & Clarke

[57] ABSTRACT

A microwave signal detector system provides a visual indication of the relative bearing of a remote source of microwave energy. An antenna for receiving said microwave energy includes a plurality of microwave-sensitive elements arranged in a planar circular array for receiving pulses from all azimuth directions. Each microwave sensing element is adapted to monitor energy received in a predetermined angular sectors and includes a horn element and a microwave energy responsive diode disposed within said horn element. The diode is connected as part of a voltage divider to develop a noise signal corresponding to the microwave energy received at each sector resulting from vibrations in the diode which occur at an audio frequency. The resultant developed noise signal is digitized and compared to a predetermined threshold to provide an output control signal when the developed signal exceeds the value of the threshold. The output signal drives an LED indicator. An LED corresponding to each sensing diode is arranged in a circular display to provide relative bearing information corresponding to the received signal. This system is particularly adapted to provide early warning of vessels in the vicinity so as to avoid possible collisions.

18 Claims, 4 Drawing Sheets

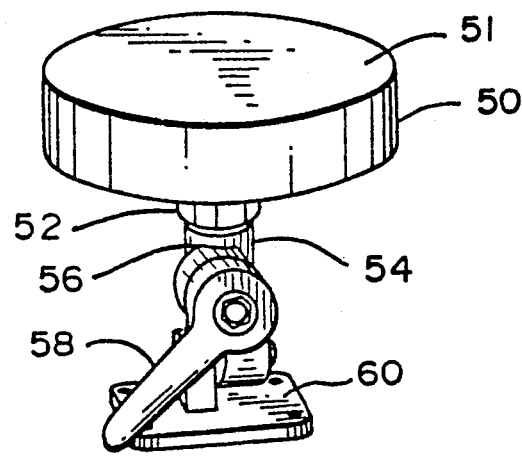
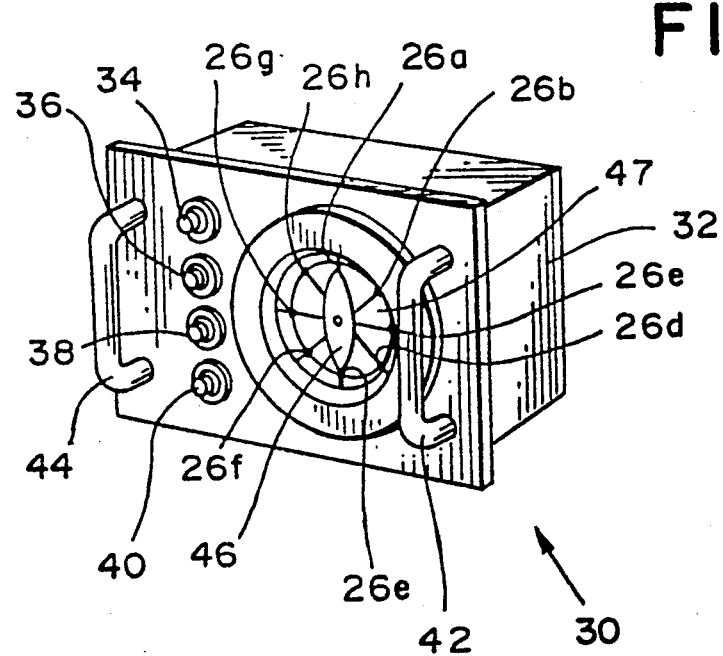
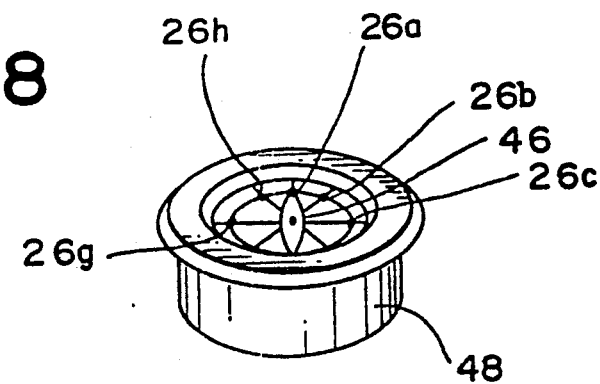

COLLISION AVOIDANCE RADAR DETECTOR SYSTEM

The present invention relates to a radar detector, and more particularly to a collision avoidance radar detector adapted to display the relative bearing of any vessel operating radar in the vicinity and provide an audible warning tone and/or visual signal upon detection of the radar signal of a nearby vessel.

BACKGROUND OF THE INVENTION

One of the greatest dangers at sea is the risk of collision. This danger is magnified considerably in coastal or inland waterways and ports where shipping is heavy and small boating is popular. Visual watches are limited by weather conditions and available personnel and, while helpful, are generally inadequate. While large ships and many smaller vessels are equipped with radar, this does not assure that the bridge or other personnel are monitoring their equipment. Further, many small vessels do not reflect radar signals adequately, and weak reflected signals may be easily overlooked on a radar screen. Heavy weather and rough seas add to the "clutter" and "noise" appearing on a radar screen, thereby increasing the difficulty of monitoring small boat activity, and may in some circumstances obliterate a signal reflected from a small boat.

Directional finding systems for locating the source of a transmission are well known. Numerous direction finding systems of the prior art employ a circular or cylindrical array of element antennas. Some of the prior systems are suitable for radio direction finding in a range of source directions that is generally broadside to the antenna array, i.e., in the general direction of an axis which is perpendicular to a plane of the circular array of element antennas. Other circularly arrayed direction finding systems of the prior art are suitable for direction finding in and near the plane of the circle of the array. For convenience, directions measured in the plane of the array will be referred to hereinafter as azimuth directions, although no limitation is intended thereby with regard to the orientation of the antenna systems relative to other objects such as a supporting vehicle or the earth. Most azimuth direction finding systems of the prior art have azimuthally directional antenna radiation patterns. For example, a single steerable beam of sensitivity, occupying generally a small sector of the complete azimuthal circle, is provided, which continually revolves through 360° azimuth to locate the azimuth direction from which a target radio wave is coming. In such prior art systems, every direction of azimuth is examined once during each revolution of the steerable beam, and each direction is examined for only a fraction of the period of revolution of the steerable beam. Such systems require complex electronic circuitry and elaborate antenna mechanisms making them generally expensive and unsuitable for small boat applications.

SUMMARY OF THE INVENTION

The present invention provides a collision avoidance radar detection system adapted to display the relative bearing of a vessel having an operating radar to warn ship operators of the presence of the other vessel which is both reliable and economical and readily adapted for use on small boats. The detector system comprises a receiving antenna arranged to scan in a 360° azimuth direction. Eight (8) individual microwave horn elements arranged in a planar circular array on axes spaced at 45° intervals, such that each horn element scans approximately a 45° sector. Each horn element has a diode positioned in its throat such that microwave energy is reflected to the diode. The diode is capable of responding to microwave frequencies in the X-band between approximately 9.2 and 10.7 gigahertz. Each diode is connected to its own signal processing channel for energizing a corresponding bearing indicator and audible warning alarm.

Upon excitation of a diode, as a result of a nearby operating radar system, a signal is developed which is amplified and applied to a digitizer which in turn develops an output pulse that is applied to a comparator circuit. When the output pulse of the digitizer exceeds a preset threshold in the comparator circuit, the output of the comparator circuit excites a light-emitting diode corresponding to the sector scanned by the horn element. The antenna is mounted so that it is aligned with the keel of the ship, and one of the LED components is set to correspond to a zero bearing. Successive LED indicators are arranged in a circular pattern and provide, at the bridge or at another remote location, visual indications corresponding to other 45° sectors. The output of the comparator circuit may also be used to enable an audible alarm. In either event, the visual display or audible alarm provide an early warning to vessel operators of a presence of another vessel in sufficient time for them to take evasive action should that be necessary.

Accordingly, it is a primary object of the present invention to provide a reliable radar detector instrument which will enable ship and boat operators to move about in crowded waters with increased confidence in avoiding collisions.

Another object of the present invention is to provide a radar detector system which provides a reliable alarm of an approaching ship having an operating radar.

Still another object of the present invention is to identify the relative bearing of an approaching ship having an operating radar.

Although the primary purpose and advantage of the present invention is for use as a collision avoidance system, the present invention offers several other advantages. Because it is possible to detect a ship operating radar beyond visual range, usually about 12 miles to the horizon, a small boat operator in distress can be alerted as to the proper time for firing a flare or establishing VHF radio contact with ships for medical emergency assistance or weather updates. Although the system of the invention is primarily directed to detection of shipboard radar, it can also detect aircraft radar operating in the frequency range of the diode element mounted in the horn and thus can be useful in establishing contact with air-rescue parties.

The elements of the present invention can be conveniently housed in an all-plastic "mushroom" housing and sealed in a potting compound, making it completely weatherproof, thereby allowing it to be exposed to all types of sea and weather conditions with no ill effects. Further, by using miniaturized and solid-state components, there is provided a highly efficient and economical detector instrument having a low current drain on a shipboard power system. Because of its relatively small size, it can be conveniently accommodated in the smallest of vessels having a 12 volt DC source. This is extremely important to small boat operators and fishermen who frequently have to take their boats in waters heavily traveled by larger commercial and military ships.

BRIEF DESCRIPTION OF THE DRAWINGS

These and other advantages of the invention will become readily apparent from the following description taken in connection with the accompanying drawings, wherein like reference characters represent like elements throughout the several views.

FIG. 7 is a front perspective view of a control panel illustrating, in particular, the indicators of the present invention;

FIG. 8 is a front perspective view of a remote indicator display which may be used in conjunction with the main control panel in accordance with the present invention; and FIG. 9 is a perspective view of an antenna housing and mounting according to the present invention.

DESCRIPTION OF THE PREFERRED EMBODIMENT

Figure 1:
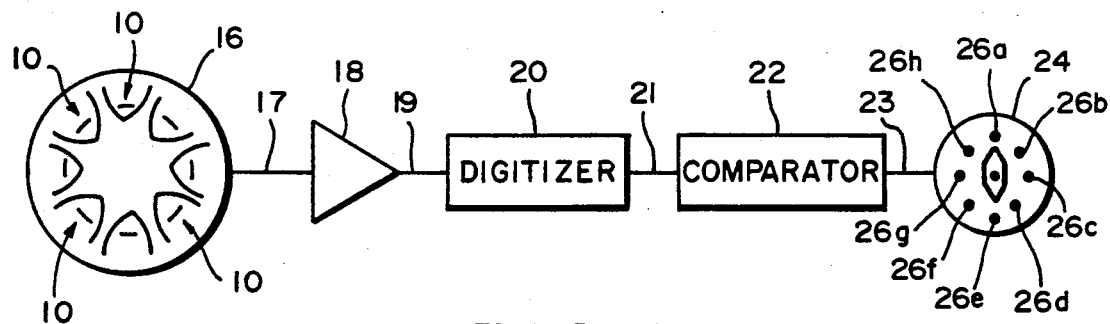
FIG. 1 is a block diagram of the present invention.

A preferred embodiment of the invention which is capable of detecting microwave radar signals from any azimuth direction is shown in block diagram form in FIG. 1. In accordance with the present invention, a plurality of element antennas 10 are arranged in a planar circumferential array. Each element antenna comprises a horn element 12 and a microwave-responsive diode 14 mounted on a substrate 16, which preferably is a printed circuit board the underside of which contains conductive paths for interconnecting components mounted on the upper side of the board.

For convenience, each like element antenna is identified with a descriptive alphabetical reference character a thru h. It will therefore be readily understood that when other parts are identified with an alphabetical reference character a thru h, that element is operatively associated with the corresponding element antenna bearing that reference character.

Eight horn elements 12a . . . 12h, and associated diodes 14a . . . 14h are arranged in a planar circular pattern centered on 45° intervals such that each horn element and associated diode are disposed to scan an azimuth arc segment of 45°. When the plurality of antenna elements 10 receive X-band radiation from an external remote source, output signals are developed by each of the element antennas 10 as a result of the incoming radiation. These output signals are fed to an associated signal processing circuit 11a . . . 11h comprising amplifier 18, digitizer 20, and comparator 22. The antenna output signals are applied on line 17 to the associated amplifier 18a . . . 18h and raised therein to a TTL level of 5 volts and fed via line 19 to a digitizer 20. Digitizer 20 converts the signal to pulse form, and the pulse is applied via 21 to a comparator 22. At comparator 22, the output of the digitizer is compared to a predetermined threshold, preferably approximately 4.5 V. DC. When a signal applied to a comparator exceeds the threshold, an indicator 24 connected to the output of the comparator via cable 23 is activated. In the preferred form, indicator 24 comprises a circular array of lights 26a . . . 26h, each of which corresponds to one of the element antennas 10a . . . 10h such that when an antenna element detects X-band radar microwave energy from a remote source sufficient to develop a signal which overcomes the threshold value set in the comparator, a corresponding light 26 is energized.

Figure 6:
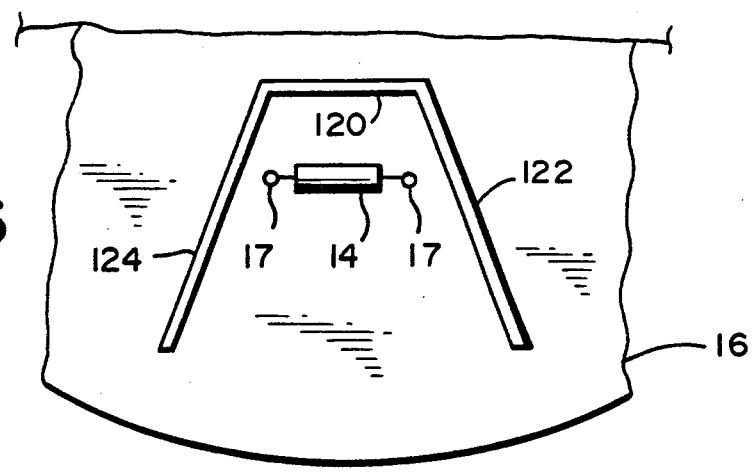
FIG. 6 is a top elevational view of the horn element shown in FIG. 4.

In operation, alarm 24 is mounted in a panel (not shown) at the bridge or operating station of the ship on which the radar detection system is operating. FIG. 6 shows a typical control panel 30, to the back of which is attached a housing 32 that contains the wiring connecting the indicators to the signal processing circuits. The face of the control panel is slightly larger than the housing so as to permit the housing to be conveniently mounted in a panel provided with a 7" × 4⅜" rectangular cutout. The face of the control panel 30 includes a circular array of eight lights 26a . . . 26h corresponding to element antennas 10a . . . 10h. Several additional indicator lights are also provided on the face of the panel including a power light 34, sensitivity light 36, audio level light 30, and an audio alarm 40. A pair of handles 42, 44, are provided to facilitate handling of the unit. A marker 46 on the face of a lined indicator card 47 to which the lights 26 are mounted is stationary and serves to identify a 0° heading.

When installing the system on a ship, the antenna is placed such that one of the antenna elements, 10a for example, is aligned with the keel of the ship. Thus, successive antenna elements 10b . . . 10h represent successive 45° positions and energization of any of the lights 26a . . . 26h provides an indication of the relative bearing of a vessel having an operating radar which is detected by one of the element antennas. Light 26a indicates the azimuth area within 327½° to 22½° of the ship's bearing. Light 26b monitors the azimuth area between 22½° to 67½°, and the remaining lights 26c . . . 26h monitor successive 45° azimuth area sectors.

One or more additional remote indicators may be provided, if desired, at different locations of the ship. A typical remote indicator 48 is illustrated in FIG. 8. Remote indicator 48 includes indicator lights which are electrically connected and parallel with the lights in the control panel 30.

The system can be conveniently mounted at any suitable location of a small vessel and to this end is packaged in a small PVC housing 50 which is mounted by means of a swivel connection 52 to a pedestal 54. Pedestal 54 is undercut, as at 56, so as to be capable of being locked in position by locking mechanism 58. The entire unit is supported from a base plate 60 adapted to be conveniently mounted by bolts or the like at a suitable location aboard ship. The electronics package assembly of the circuit is entirely comprised of solid-state elements, and after being placed in housing 50 is environmentally sealed by a suitable potting compound after which cover 51 is applied and secured in place. The overall dimensions of the entire system within which all of the electronics are packaged, except for the indicators, are approximately 6.5" × 7.5" inclusive of the pedestal, and the depth for the housing of the electronics is approximately 2". There is thus provided a very compact and efficient unit, readily adapted for use even on very small boats.

Figure 3:
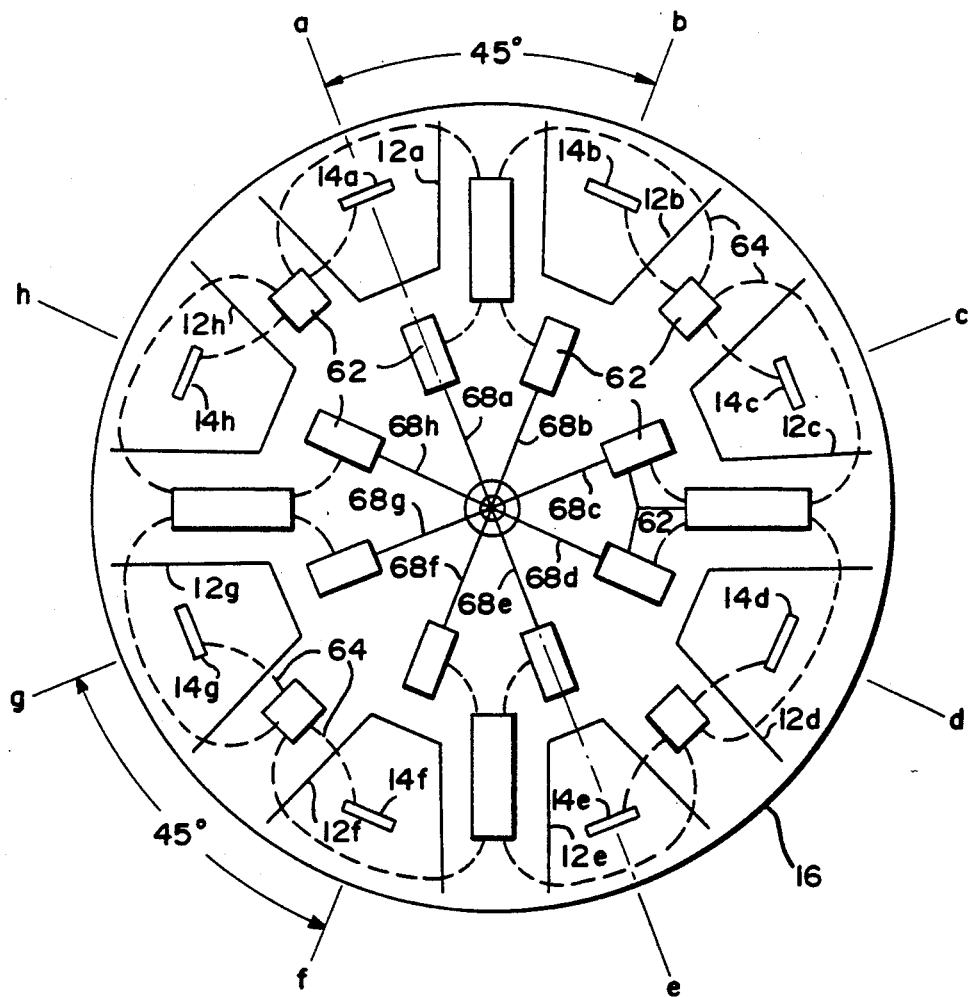
FIG. 3 is a plan view of an antenna layout on a printed circuit board showing solid-state components which make up the circuit of the invention and, in particular, the planar circular array comprising eight microwave horn elements, each of which has positioned in its throat a microwave-responsive diode.

Referring now to FIG. 3, there is illustrated the electronics package which is mounted within housing 50. The package contains a printed current board or substrate 16 having a plurality of element antennas 10a... 10h spaced about the periphery on axes spaced at 45° intervals. Mounted on the top surface of substrate 16 are a plurality of integrated circuits 62 and individual resistive and capacitive components which are interconnected on the back side of the card via conductive paths 64. The output from the signal processing circuit is connected via conductors 66a-68h to associated light-emitting diodes, previously identified as 26a... 26h. To this end, the center of the board includes a central grommetted opening through which output leads 68a... 68h pass into the hollow supporting pedestal arm and thereafter to the control panel and remote panel locations by a suitable connecting cable (not shown). It should be apparent that each integrated circuit is formed within a semiconductor chip which may contain more than an operative element of a channel. For example, amplifiers 18 are on an LM 380 chip which is a dual operational amplifier. Thus this chip serves two channels and four are required since eight channels a...h are used. The details of the signal processing circuit are shown in FIG. 2 and will be described in connection therewith.

Figure 2:
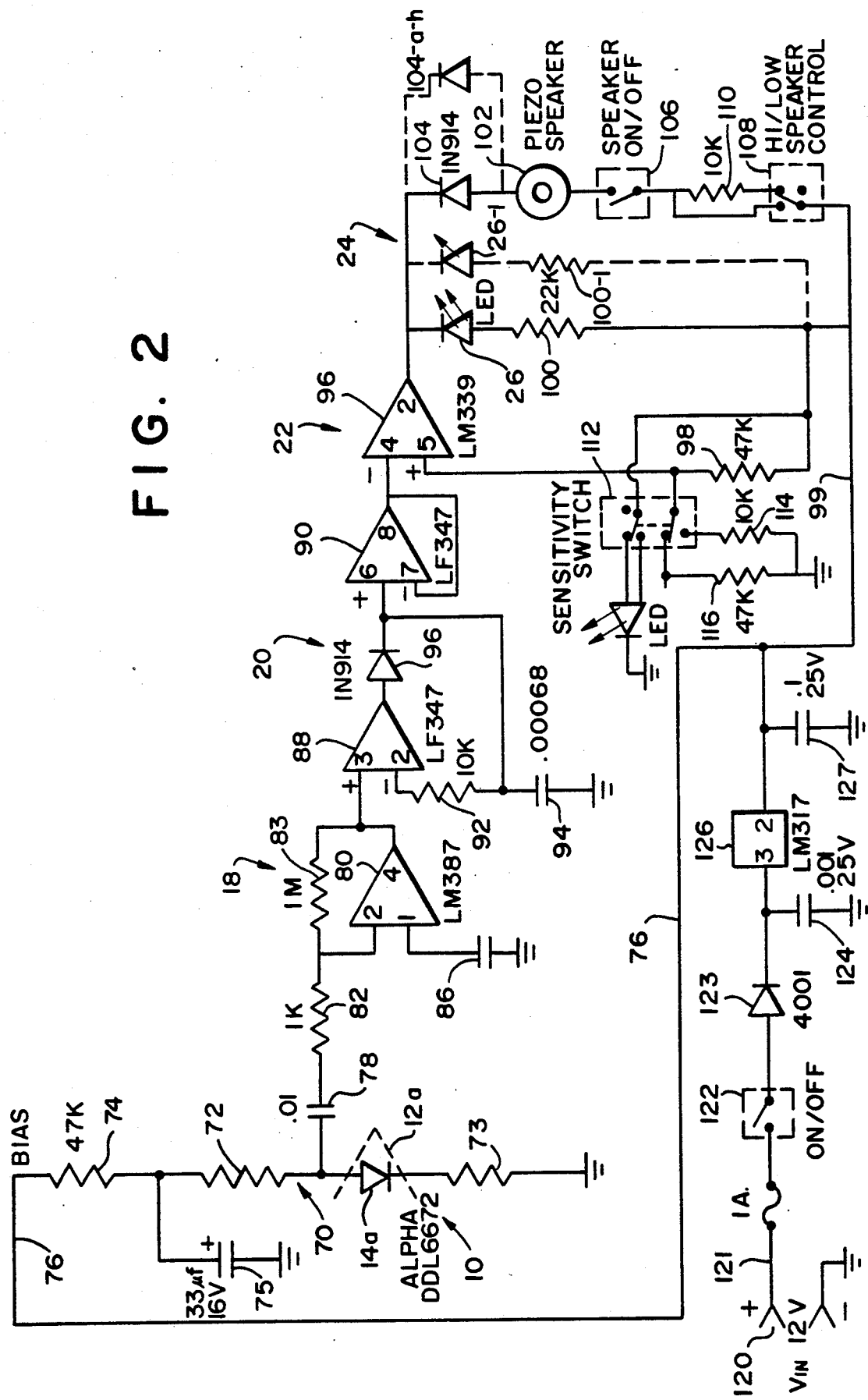
FIG. 2 is a schematic diagram of one of eight channels responsive to monitoring a 45° sector.

Referring now to FIG. 2, there is illustrated the signal processing circuit of the present invention. For convenience, only the circuit associated with antenna element 10a is illustrated, it being understood that each antenna element has an identical circuit for processing a signal derived by the corresponding antenna.

Diode 14a of element 10a is serially connected to a resistor divider network 70 comprising resistors 72 and 73, the diode being connected between the resistors with the other end of resistor 73 being connected to ground, and the other end of resistor 72 being connected to an RC input filter comprising resistor 74 and capacitor 75 for smoothing voltage and eliminating noise from the voltage supply line 76. Capacitor 75 and resistor 72 also form another RC circuit which cooperates with diode 14a to allow the diode to produce noise and an output signal responsive to microwave radiation.

When diode 14a is bombarded with microwave radiation at the frequency within the parameters of the diode, changes of resistance occur in the diode which are reflected in variations in current drawn through the divider network 70. These changes correspond to noise due to vibrations in the diode and occur at an audio frequency. The signal is coupled via capacitor 78 to amplifier 80 which may be ½ of an LM 387 integrated circuit chip. Resistors 82 and 83 form a feedback circuit for amplifier 80 to maintain its gain at approximately 1,000. One end of resistor 82 is connected to capacitor 78, while the junction of resistors 82 and 83 is connected to the number 2 pin of amplifier 80. The other end of resistor 83 is connected to pin 4 of amplifier 80. A stabilizing capacitor 86 is connected from pin 1 of amplifier 80 to ground. The output of amplifier 80 is an amplified version of the variations occurring at the junction of resistor 72 and the anode of diode 14a and is applied to pin 3 of a quad operational amplifier LF 347 two sections 88 and 90 of which are used to form the digitizer 20. The output of the amplifier is applied to the positive input at pin 3, with the negative input being connected via resistor 92 and capacitor 94 to ground. The output of the first stage 88 is connected via diode 96, which may be a 1N914 or equivalent to the positive input pin 6 of the second stage 90 of the integrated circuit. Pin 6 is also connected to the junction of resistor 92 and capacitor 94.

The purpose of digitizer 20 comprising stages 88 and 90 is to create a DC voltage pulse responsive to the voltage fluctuations caused by the excited antenna element which is applied to the comparator 22. With no resistance to the positive input of the digitizer element 88, the resistance to the negative input gain is greater than 1. The amplified positive voltage fluctuations are passed through diode 96 and stored in capacitor 94. The circuit operates similar to a pump, charging up the capacitor with pulses that are passed through diode 96 until the voltage on the capacitor is sufficient to cause it to discharge through element 90 and apply a pulse to the inverting input, pin 4, of comparator 96. The noninverting input, pin 5, of comparator 96 has applied thereto a threshold voltage of approximately 4.5 volts. To this end, pin 5 is connected to one end of resistor 98, the other end of which is connected to the positive bus or rail 99. If the digitized signal is lower than the threshold voltage, the resistance through the output to ground is infinite preventing an output signal from activating the alarm circuits. When the digitized signal rises above the threshold voltage, comparator 96 switches, thereby applying the output pulse to its load comprising the indicator circuits 24.

As shown in FIG. 2, the indicator circuit 24 comprises an LED 26 having its cathode connected to the output pin 2 of comparator 96 and its anode connected via resistor 100 to positive bus 99. LED 26 forms the primary visual indicator mounted on control panel 30. One or more remote LED devices 26-1 and associated current limiting resistor 100-1 may be connected in parallel with LED 26 and are shown in the Figure in phantom. In addition to the visual indicator and alarm provided by LED 26, an audible alarm may be provided by way of piezoelectric speaker 102. Diode 104 connected between speaker 102 and pin 2 of comparator 96 prevents the audio circuit from activating light emitting diodes of other sectors a-h. To this end, speaker 102 is connected to receive the output of each signal processing circuit via a separate diode 104a... h, shown in phantom so that only one speaker common to all sectors a-h need be utilized. Speaker 102 may be manually placed in or out of the circuit through manually operated switch 106 serially connected therewith. Also, provided in the speaker circuit is a volume control. The volume of the speaker is controlled by means of a high-low speaker control comprising manually operated switch 108 and current limiting resistor 110 adapted to be connected in series with the speaker and limit the driving current therein.

Comparator 96 also includes a sensitivity switch 112 which decreases the threshold voltage to approximately 2 volts DC when a higher sensitivity is desired. Switch 112 is adapted to connect either resistor 114 or resistor 116 into the circuit.

Switch 112 includes a second movable contact for connecting a two-color LED 118 to the positive rail 99. This provides the green and red indicator lights on the control panel. The positive rail 99 is supplied with voltage from an external source which may be plugged into jacks 120. Input line 121 is fused with a one-amp fuse and includes ON/OFF switch 122 and a filter comprising diode 123 and capacitor 124. Filter 125 is connected to the input of a voltage regulator 126 which may be an LM 317 I.C.. The output of regulator 126 is connected to rails 76 and 99. Smoothing capacitor 127 further serves to minimize fluctuations in the line.

Figure 5:
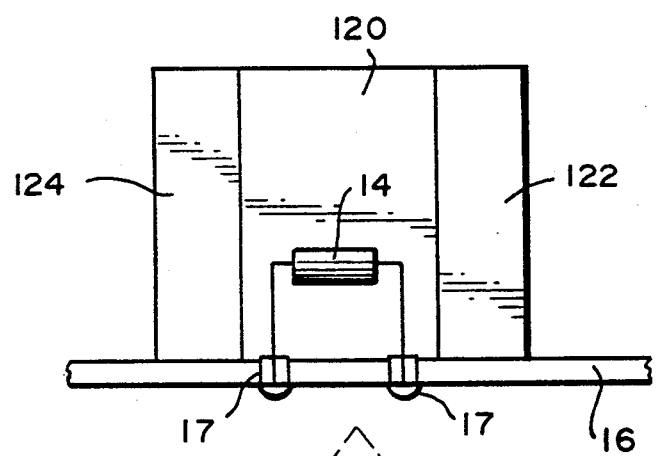
FIG. 5 is a front elevational view of the horn element shown in FIG. 4.
Figure 4:
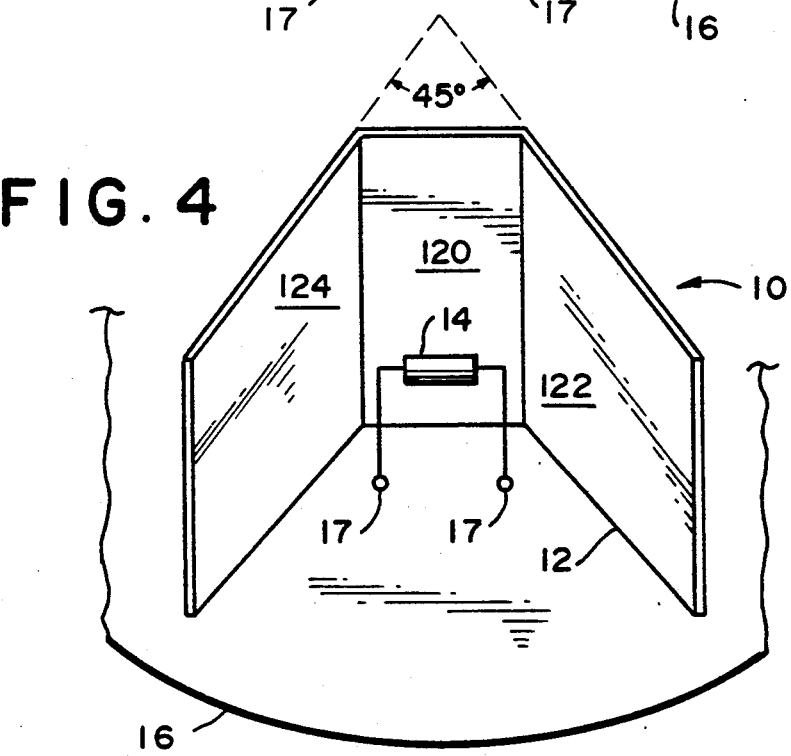
FIG. 4 is a fragmentary, perspective view of the printed circuit board at FIG. 3 showing a single V-shaped horn element as used in the present invention.

FIGS. 4, 5 and 6 illustrate in greater detail antenna element 10 comprising horn element 12 and microwave diode 14. There are eight brass, truncated V-shape microwave horns spaced about the periphery of printed circuit board 16. Each horn element is mounted to the substrate 16 and comprises a back wall 120, approximately 1.2 centimeters in width and two extending sidewalls 122, 124, each extending approximately 3 centimeters in length. The height of the horn element is 3 centimeters. Disposed in the throat of the horn is microwave diode 14 which is mounted approximately one centimeter above the surface of the substrate and approximately 2.2 centimeters from the back wall. The leads of diode 14 pass through openings 17 in board 16 and ar soldered to appropriate terminals on the bottom side of the board. It is, of course, possible to mount the microwave diode 14 with its leads extending to opposite sides of the sidewalls of the horn.

As shown in FIG. 3, to maximize miniaturization space limitations will require mounting of components between the sidewalls of adjacent horns. In that event, the angle of the sidewalls of the horn may be reduced such that the angle is less than 45°. Because many surface radars used on ships have wide lobes, this presents no serious limitation in operation of the system.

While the invention has been described in relation to a specific embodiment which has been illustrated and described in detail, it will be understood that various changes will suggest themselves to those skilled in the art without departing from the true spirit of the inventive principles as set forth in the appended claims and resort to the claims should be made for a complete understanding of the full scope of the invention.

I claim:

1. A microwave signal detector comprising a microwave sensitive receiving means, said microwave sensitive receiving means including a microwave responsive element comprising a horn element forming a microwave cavity and having a microwave-responsive diode mounted in said cavity and serially connected to a resistive voltage divider network, said microwave responsive element being responsive to microwave energy signals generated from a remote source to produce a noise signal at an audio frequency resulting from vibration of the responsive element, means connected to said microwave responsive element for coupling said noise signal produced in response to received microwave energy, a comparator for comparing the noise signals to a predetermined threshold voltage, and indicator means for providing an indication of the detection of a source of microwave energy when the value of the developed noise signal exceeds the threshold voltage.

2. A microwave signal detector, as set forth in claim 1, wherein said diode is responsive to frequency in the X-band.

3. A microwave signal detector, as set forth in claim 1, including a plurality of said signal detectors arranged in a circular array at predetermined fixed angular intervals.

4. A microwave signal detector, as set forth in claim 3, wherein said indicator means comprises a circular array of visual indicators, each visual indicator comprising a light-emitting diode adapted to be energized in response to a developed noise signal for providing a visual indication of the relative bearing of the source of the received microwave signals.

5. A microwave signal detector system, as set forth in claim 4, further including audible alarm means responsive to a developed signal for providing an audible alarm in response to received microwave signals.

6. A microwave signal detector system, as set forth in claim 5, further including remote indicator means comprising a circular array of visual indicators, each visual indicator comprising a light-emitting diode adapted to be energized in response to a developed noise signal for providing a remote visual of the relative bearing of the source of received microwave signals, said remote indicator means being connected electrically in parallel with said first indicator means.

7. A microwave detector system, as set forth in claim 3, wherein each said microwave receiving means includes a horn element forming a microwave cavity and having a microwave-responsive diode mounted therein and said plurality of signal detectors comprises eight detecting elements arranged in a circular planar array at 45° intervals.

8. A microwave signal detector system, as set forth in claim 7 wherein said indicator means comprises a circular array of visual indicators, each visual indicator comprising a light-emitting diode adapted to be energized in response to a developed signal from a corresponding one of said signal detectors for providing a visual indication of the relative bearing of the source of a received signal, each light-emitting diode corresponding to one of said 45° sectors.

9. A collision avoidance microwave signal detector system for providing an indication of the relative bearing of a remote source of microwave energy comprising an antenna for receiving said microwave energy, said antenna including a plurality of microwave sensitive means arranged in a planar circular array for monitoring microwave energy sensing means including a horn element and a microwave energy responsive diode disposed within said horn element adapted to monitor energy received in a predetermined angular sector, each said diode being serially connected to a resistive element forming a voltage divider for developing a noise signal at an audio frequency corresponding to the microwave energy received at each sector, means for comparing each said developed noise signal to a predetermined threshold and providing an output control signal when the developed noise signal exceeds the value of the threshold.

10. A microwave signal detector system, as set forth in claim 9 wherein each said diode is mounted in a horizontal position.

11. A microwave signal detector system, as set forth in claim 9, wherein each said horn element includes a first wall, a second wall and a third wall, second and third walls extending angularly outwardly from said first wall and forming an angle therewith and being disposed to face outwardly from the center of the circular array for reflecting microwave energy from an individual azimuth sector to the diode.

12. A microwave signal detector system, as set forth in claim 11, wherein the number of microwave diodes is eight, and each diode is adapted to receive microwave energy in a 45° sector and each said diode is mounted in a horizontal position between said second and third walls and spaced outwardly from said first wall.

13. A microwave signal detector system, as set forth in claim 9, wherein said horn elements are mounted on a substrate, said substrate being disposed in a weatherproof housing, and means connected to said housing for orientating said housing.

14. A microwave signal detector system, as set forth in claim 13, wherein said means for orientating said housing includes a swivel and means for locking the housing in the orientated position.

15. A microwave signal detector system as set forth in claim 9 further including means for each sector for amplifying the noise signal, digitizer means for developing an output pulse corresponding to the noise signal, and indicator means for receiving said output central signal when the output pulse exceeds the predetermined threshold.

16. A microwave signal detector, as set forth in claim 15, wherein said indicator means comprises a circular array of visual indicators, each visual indicator comprising a light-emitting diode adapted to be energized in response to an output control signal for providing a visual indication of the relative bearing of the source of the received microwave signals.

17. A microwave signal detector system, as set forth in claim 16, further including audible alarm means for each sector responsive to an output control signal for providing an audible alarm in response to received microwave signals.

18. A microwave signal detector system, as set forth in claim 16, further including remote indicator means comprising a circular array of visual indicators, each visual indicator comprising a light-emitting diode adapted to be energized in response to an output control signal for providing a remote visual indication of the relative bearing of the source of received microwave signals, said remote indicator means connected electrically in parallel with said first indicator means.

* * * * *